(12) United States Patent
Nishioka

(10) Patent No.: US 10,133,462 B2
(45) Date of Patent: Nov. 20, 2018

(54) ELECTRONIC DEVICE HAVING A SLOT ANTENNA

(71) Applicant: LENOVO (SINGAPORE) PTE. LTD., Sinagpore (SG)

(72) Inventor: Yoshio Nishioka, Kanagawa-ken (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 103 days.

(21) Appl. No.: 15/332,762

(22) Filed: Oct. 24, 2016

(65) Prior Publication Data

US 2017/0365930 A1 Dec. 21, 2017

(30) Foreign Application Priority Data

Jun. 20, 2016 (JP) .................... 2016-121936

(51) Int. Cl.
| | |
|---|---|
| *H01Q 13/10* | (2006.01) |
| *G06F 3/0484* | (2013.01) |
| *G06F 3/14* | (2006.01) |
| *H01Q 1/22* | (2006.01) |
| *H01Q 21/28* | (2006.01) |
| *G06F 3/0487* | (2013.01) |
| *G09G 5/38* | (2006.01) |

(52) U.S. Cl.
CPC ............ *G06F 3/04845* (2013.01); *G06F 3/14* (2013.01); *G06F 3/1454* (2013.01); *H01Q 1/2258* (2013.01); *H01Q 1/2266* (2013.01); *H01Q 13/10* (2013.01); *H01Q 21/28* (2013.01); *G06F 3/0487* (2013.01); *G06F 2203/04803* (2013.01); *G09G 5/38* (2013.01); *G09G 2340/12* (2013.01); *G09G 2370/00* (2013.01)

(58) Field of Classification Search
CPC .......................... H01Q 13/10; H01Q 1/2258
See application file for complete search history.

(56) References Cited

U.S. PATENT DOCUMENTS

| | | | | |
|---|---|---|---|---|
| 2012/0050975 | A1* | 3/2012 | Garelli | G06F 1/1615 361/679.27 |
| 2012/0068893 | A1* | 3/2012 | Guterman | H01Q 1/2266 343/702 |
| 2013/0293425 | A1* | 11/2013 | Zhu | H01Q 1/243 343/702 |
| 2017/0346164 | A1* | 11/2017 | Kim | H01Q 1/243 |

* cited by examiner

*Primary Examiner* — Dameon E Levi
*Assistant Examiner* — David Lotter
(74) *Attorney, Agent, or Firm* — Antony P. Ng; Russell Ng PLLC

(57) ABSTRACT

An electronic device having a slot antenna is disclosed. The electronic device includes a main unit chassis and a display chassis. The main unit chassis includes a base cover formed of a conductor, and a keyboard and a keyboard cover formed of a dielectric. The base cover includes a slot. The display chassis is connected to the main unit chassis through a hinge. The upper surface of the display chassis is covered by a display rear cover formed of a conductor. The lower surface of the display chassis is covered by a display unit and a bezel formed of a dielectric. A slot antenna is formed in a bezel area of the display rear cover. The slot of the base cover is located at a position that opposes a slot of the slot antenna when the display rear cover of the display chassis is overlapping with the main unit chassis.

20 Claims, 6 Drawing Sheets

US 10,133,462 B2

ELECTRONIC DEVICE HAVING A SLOT ANTENNA

PRIORITY CLAIM

The present application claims benefit of priority under 35 U.S.C. §§ 120, 365 to the previously filed Japanese Patent Application No. JP2016-124836 with a priority date of Jun. 23, 2016, which is incorporated by reference herein.

TECHNICAL FIELD the present relates to electronic devices in general, and in particular to an electronic device having a slot antenna.

BACKGROUND

A slot antenna in an electronic device may have an antenna gain when the electronic device is operated in various operation modes.

SUMMARY

In accordance with one embodiment of the present disclosure, an electronic device includes a main unit chassis and a display chassis. The main unit chassis includes a lower surface having a base cover formed of a conductor, and an upper surface having a keyboard and a keyboard cover formed of a dielectric. The base cover includes a slot. The display chassis is connected to the main unit chassis through a hinge. The upper surface of the display is covered by a display rear cover formed of a conductor. The lower surface of the display chassis is covered by a display unit and a bezel formed of a dielectric. A slot antenna is formed in a bezel area of the display rear cover. The slot of the base cover is located at a position that opposes a slot of the slot antenna when the display rear cover of the display chassis overlaps with the lower surface or the upper surface of the main unit chassis.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
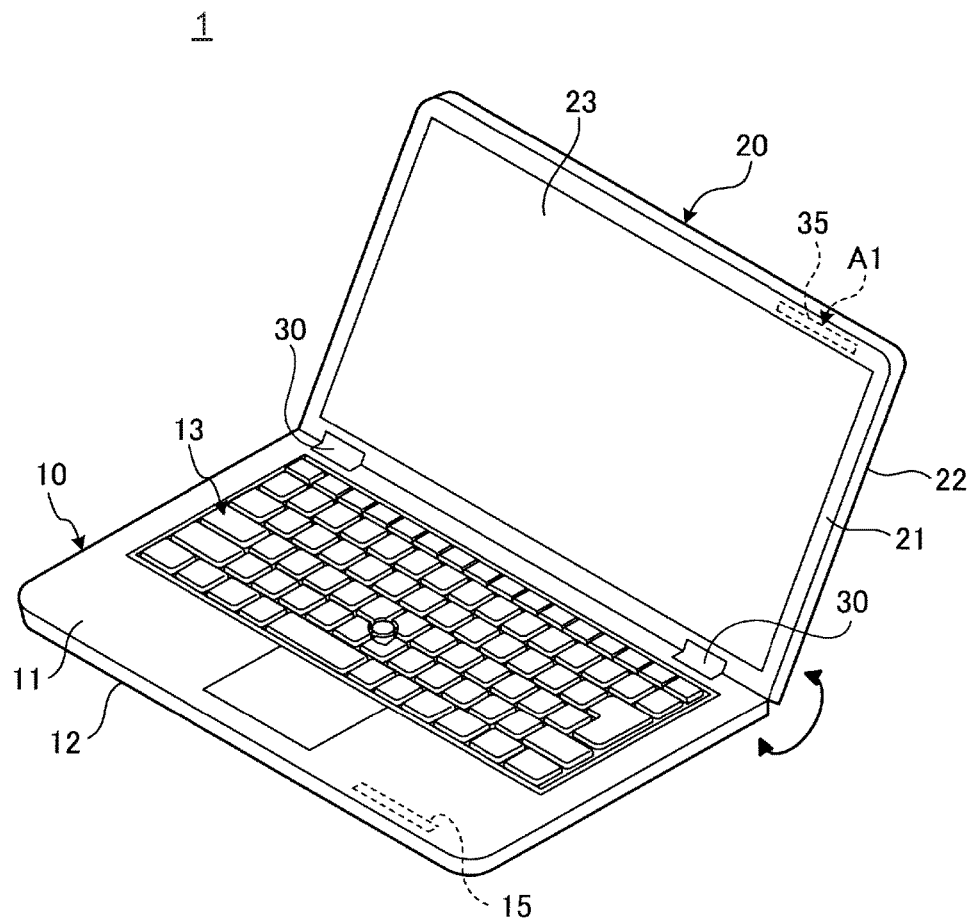
FIG. 1 is a diagram of an electronic device being used in a laptop PC mode.

Referring now to FIG. 1, an electronic device 1 has a main unit chassis 10, a display chassis 20, and left and right hinge units 30. In the following description, a state (zero-degree position) in which the display chassis 20 has been closed with respect to the main unit chassis 10 from the state illustrated in FIG. 1 will be a reference state. In this reference state, the ends of the display chassis 20 and the main unit chassis 10 on the hinge unit 30 side will be referred to as the rear ends (rear), the ends on the opposite side therefrom will be referred to as the front ends (front), the direction of thickness will be referred to as the vertical direction, and the direction of width will be referred to as the lateral direction in the description below.

The electronic device 1 is a so-called convertible PC having hinge units 30, which enable the display chassis 20 to be pivoted to an angle position of approximately 90 degrees with respect to the main unit chassis 10, so that the electronic device 1 can be ideally used as a laptop PC (refer to FIG. 1). When the display chassis 20 is pivoted to a 360-degree position with respect to the main unit chassis 10 and then reversed, the electronic device 1 can be ideally used as a tablet PC. The present disclosure, however, can be applied not only to a PC but also to other electronic devices in which two chassis can be folded through a hinge unit, such as, for example, a cell phone, a smartphone, or an electronic organizer.

The main unit chassis 10 is formed on a flat plate shape and a box shape, as illustrated in FIG. 1. The main unit chassis 10 is connected to the display chassis 20 by the hinge units 30 provided at the rear end of the main unit chassis 10. Further, an input unit, such as a keyboard assembly 13, is provided on the upper surface of the main unit chassis 10 by using a keyboard cover 11 formed of a dielectric. Provided inside the main unit chassis 10 are various types of electronic components, such as boards, arithmetic units, and memories (not illustrated). The lower surface of the main unit chassis 10 is covered by a base cover 12 formed of a conductor, such as a metal. The keyboard assembly 13 may alternatively be composed of, for example, a so-called on-screen keyboard displayed don a touch panel display (not illustrated) provided on the upper surface of the main unit chassis 10.

As illustrated in FIG. 1, the display chassis 20 is formed like a flat plate that is thinner than the main unit chassis 10. The display chassis 20 is connected with the main unit chassis 10 by the hinge units 30 provided at the rear end thereof. Further, the lower surface of the display chassis 20 is provided with a display unit, such as a display unit 23, by using a bezel 21 formed of a dielectric. The upper surface of the display chassis 20 is covered by a display rear cover 22 formed of a conductor, such as a metal. The display unit 23 is composed of, for example, a touch panel liquid crystal display.

The hinge units 30 are adapted to openably and closably connect two chassis, namely, the main unit chassis 10 and the display chassis 20. As illustrated in FIG. 1, the hinge units 30 here are composed of a pair of left and right hinges and disposed on the outer side of the display unit 23. The hinge units 30 enable the display chassis 20 to pivot from a zero-degree position to the 360-degree position with respect to the main unit chassis 10. If the display chassis 20 is set at the angle position of approximately 90 degrees with respect to the main unit chassis 10, then the electronic device 1 is set to a laptop PC mode thereby to be used as a laptop PC. If the display chassis 20 is pivoted to the 360-degree position with respect to the main unit chassis 10, then the electronic device 1 is set to a tablet PC mode thereby to be used as a tablet PC.

Figure 2:
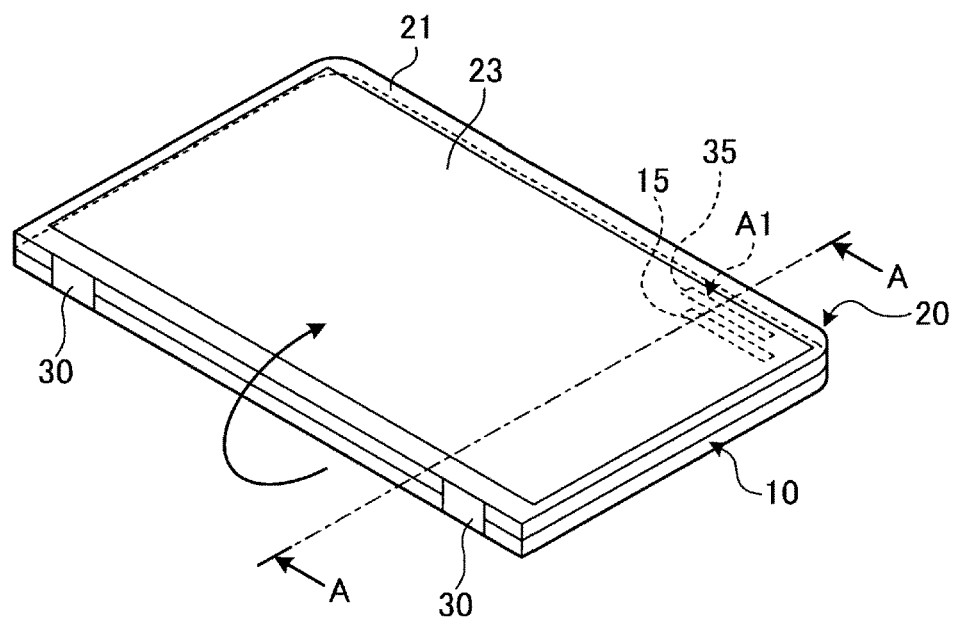
FIG. 2 is a diagram of the electronic device from FIG. 1 being used in a tablet PC mode.

As illustrated in FIGS. 1 and 2, a slot antenna A1 is formed at an end portion of the display rear cover 22. More specifically, a slot 35 of the slot antenna A1 is formed at a location that opposes the bezel 21 on the lower surface. Further, the base cover 12 has a slot 15 formed at a position opposing the slot 35 of the slot antenna A1 in the table PC mode, in which the display chassis 20 is rotated 360 degrees with respect to the main unit chassis 10 so as to be folded as illustrated in FIG. 2. In the tablet PC mode, a resonance occurs when the slot 35 of the slot antenna A1 and the slot 15 of the base cover 12 are brought close to each other.

Figure 3:
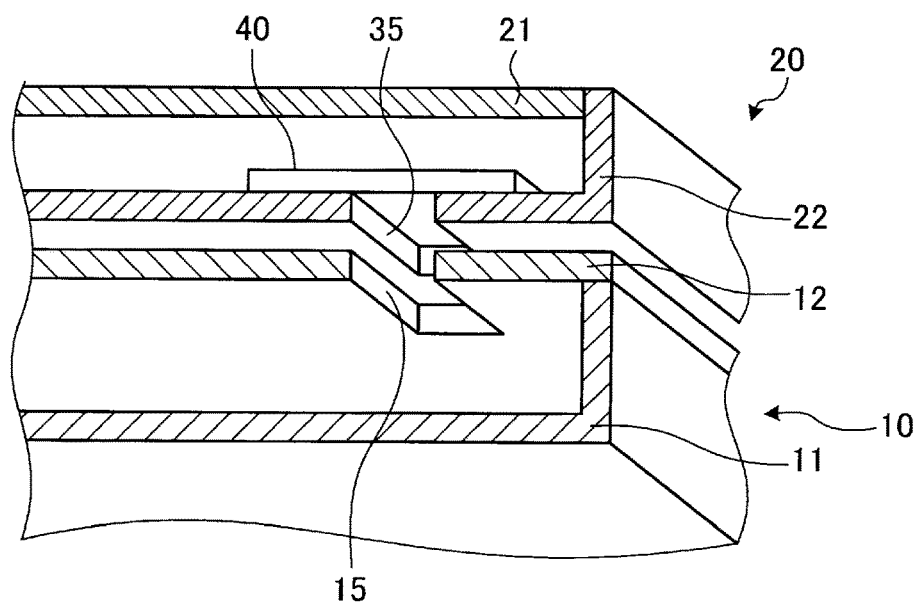
FIG. 3 is a perspective view of a section taken along a line A-A of the electronic device from FIG. 2.

FIG. 3 is a perspective view of a section taken along a line A-A of the electronic device 1 shown in FIG. 2, illustrating the positional relationship between the slot 35 of the slot antenna A1 and the slot 15 of the base cover 12 in the tablet PC mode. As illustrated in FIG. 3, the slot 35 and the slot 15 have the same shapes, and the openings thereof overlap in the vertical direction.

The slot 15 of the base cover 12 is provided to secure an antenna gain. If the slot 15 is not provided, then the radiation of radio waves is impaired with a resultant reduced antenna gain due to the influence of the base cover 12 made of a conductor, such as a metal, in the tablet PC mode illustrated in FIG. 2. In contrast, according to the present disclosure, the slot 15 is formed in the base cover 12 at the position opposing the slot 25 of the slot antenna A1, as illustrated in FIG. 3, thus making it possible to prevent a reduction in the antenna gain.

In order to prevent a reduction in the antenna gain of the slot antenna A1 in the tablet PC mode, the slot antenna A1 could be offset in an outer direction to cause the slot antenna A1 to extend beyond the display chassis 20 so as to prevent the slot antenna A1 from overlapping the base cover 12. In this case, the presence of the extended slot antenna A1 would interfere with an operation and also impair the appearance from a design aspect. Further, the portion of the base cover 12 to which the slot antenna A1 opposes could be formed of a dielectric. However, forming such an end portion by a dielectric would deteriorate the strength of the electronic device 1. According to the present disclosure, simply forming the slot 15 at the position opposing the slot antenna A1 makes it possible to suppress a reduction in the antenna gain of the slot antenna A1 while maintaining the strength by a simple configuration.

Figure 4:
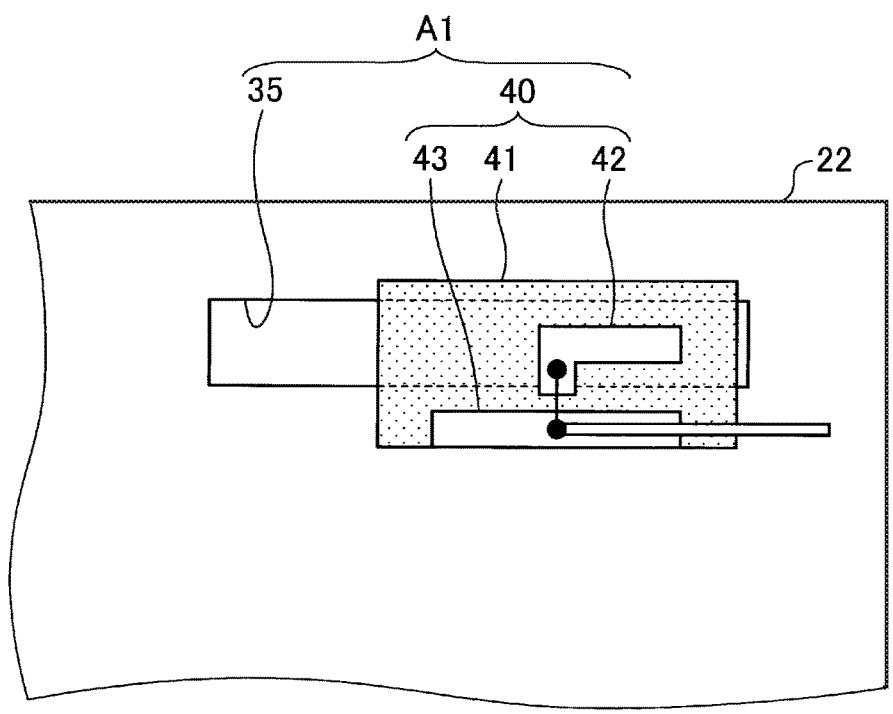
FIG. 4 is a diagram illustrating a feeder of a slot antenna excited by a monopole antenna.

FIG. 4 illustrates an example of a specific structure of the slot antenna A1. As illustrated in FIG. 4, a feeder 40, which excites the slot antenna A1, is provided in the slot 35 of the slot antenna A1. The feeder 40 has a monopole antenna 42 disposed in the slot 35. A ground 43 is connected to the monopole antenna 42. The monopole antenna 42 and the ground 43 are formed on a board 41, which uses a printed circuit board (PCB) or a flexible printed circuit board (FPC). The monopole antenna 42 on the board 41 is disposed in the slot 35. The slot antenna A1 is excited by the excitation of the monopole antenna 42. The monopole antenna 42 is an example of the feeder antenna for exciting the slot antenna A1 and may be a different feeder antenna, such as a dipole antenna.

Figure 5:
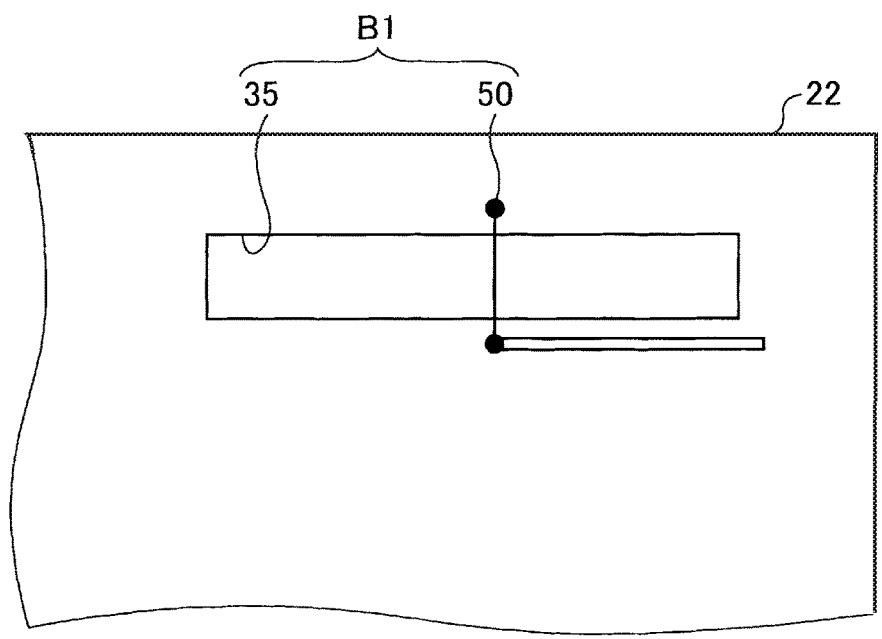
FIG. 5 is a diagram illustrating the feeder of the slot antenna from FIG. 4 when the slot antenna is directly excited.

As in the case of a slot antenna B1 illustrated in FIG. 5, a feeder 50 adapted to perform direct excitation in the vicinity of the center in the longitudinal direction of the slot 35 may be used rather than using a feeder antenna.

The insides of the slot 35 and the slot 15 are preferably filled with a dielectric rather than leaving them hollow. Filling the slots with a dielectric makes it possible to shorten the electrical lengths of the slot 35 of the slot antenna A1 and the slot 15 and to make the main unit chassis 10 and the display chassis 20 dust-proof and drip-proof.

Figure 6:
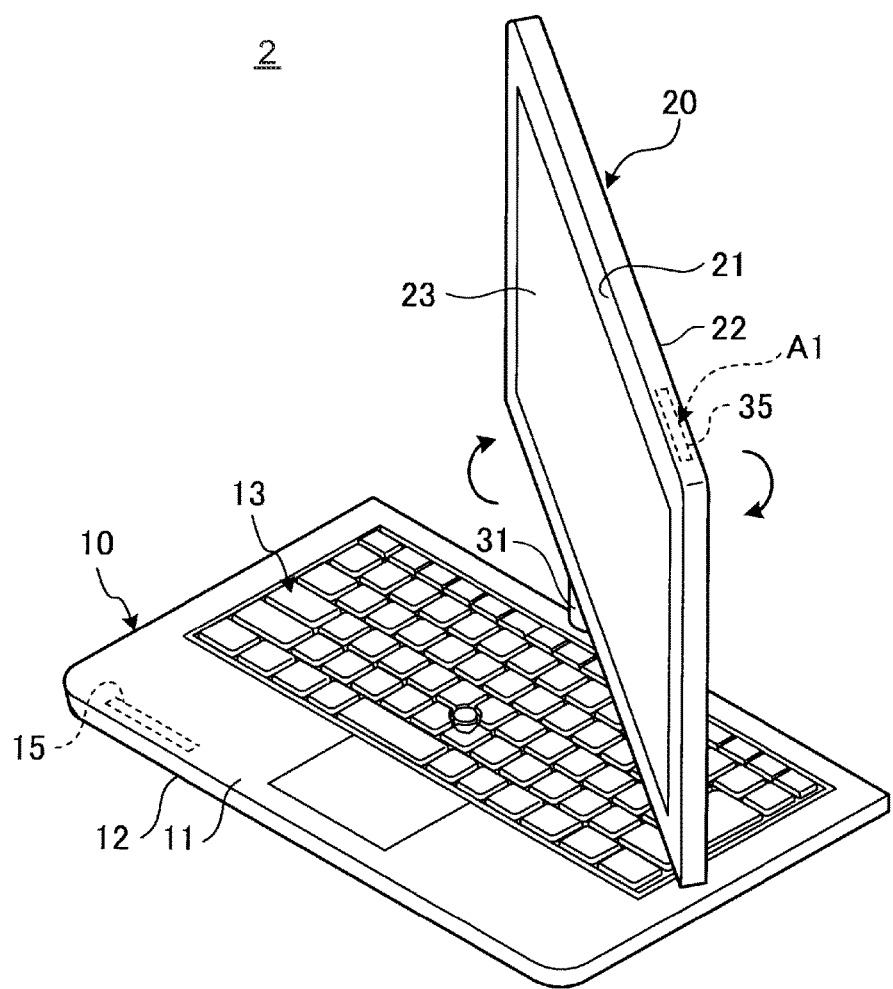
FIG. 6 is a diagram illustrating the placement relationship between a slot of a slot antenna and another slot placed in correspondence with the slot of the slot antenna in an electronic device that enables a display chassis to be rotated by a single hinge to place a display rear cover on a keyboard on the upper surface of a main unit chassis.

In the electronic device 1 described above, the display rear cover 22 and the base cover 12 face each other and overlap in the tablet PC mode. The configuration of the slot 25 of the slot antenna A1 and the slot 15 described above can be applied also to, for example, an electronic device 2 in which a main unit chassis 10 and a display chassis 20 are connected at the center of each of their rear end portions by a single hinge unit 31, as illustrated in FIG. 6.

The hinge unit 31 of the electronic device 2 supports the main unit chassis 10 and the display chassis 20, enabling the main unit chassis 10 and the display chassis 20 to pivot in the directions for opening and closing with respect to each other. In the electronic device 2, with the display chassis 20 opened with respect to the main unit chassis 10, the display chassis 20 can be rotated about the hinge unit 31 by at least 180 degrees. In the table PC mode, the display chassis 20 is rotated until a display rear cover 22 faces and overlaps a keyboard assembly 13 and a keyboard cover 11. As illustrated in FIG. 6, the slot 15 is placed at a position that opposes the slot 35 of the slot antenna A1.

Figure 7:
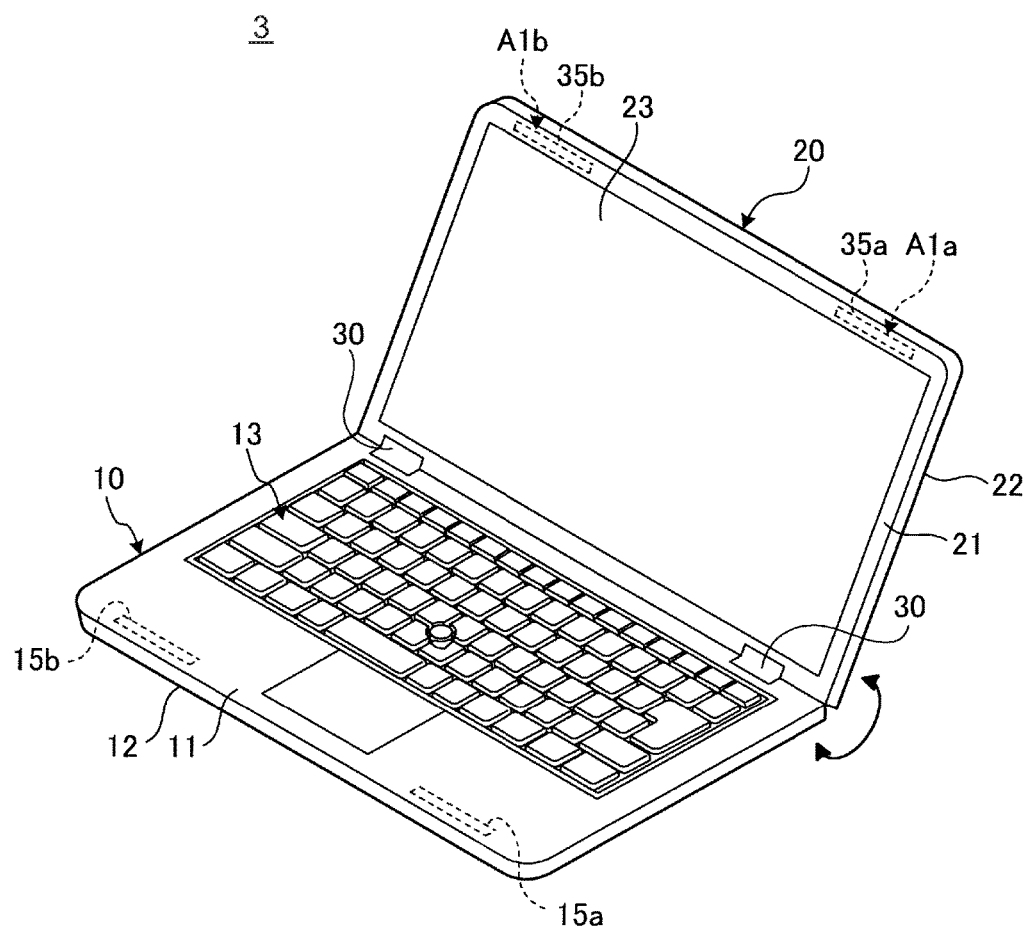
FIG. 7 is a diagram illustrating the placement relationship between the slots of slot antennas and slots placed in correspondence with the slots of the slot antennas in an electronic device equipped with multiple slot antennas.

Further, in the foregoing disclosure, the description has been given of the electronic devices 1 and 2, each of which has a single slot antenna A1; however, the present disclosure is not limited thereto. The configuration of the slot 35 of the slot antenna A1 and the slot 15 described above can be applied also to an electronic device 3 provided with not less than two slot antennas A1a and A1b. According to the electronic device 3 illustrated in FIG. 7, slots 35a and 35b corresponding to two slot antennas A1a and A1b, respectively, are provided in the electronic device 1 illustrated in FIG. 1, and slots 15a and 15b are formed at positions on a base cover 12, the positions opposing the slots 35a and 35b. If not less than the two slot antennas A1a and A1b are provided, then the resonance lengths of the slots 35a and 35b of the slot antennas A1a and A1b, respectively, can be set to different values, thus enabling a plurality of radio communication units to be provided. In this case, the slots 15a and 15b will resonate with the slots 35a and 35b of the slot antennas A1a and A1b.

Figure 8:
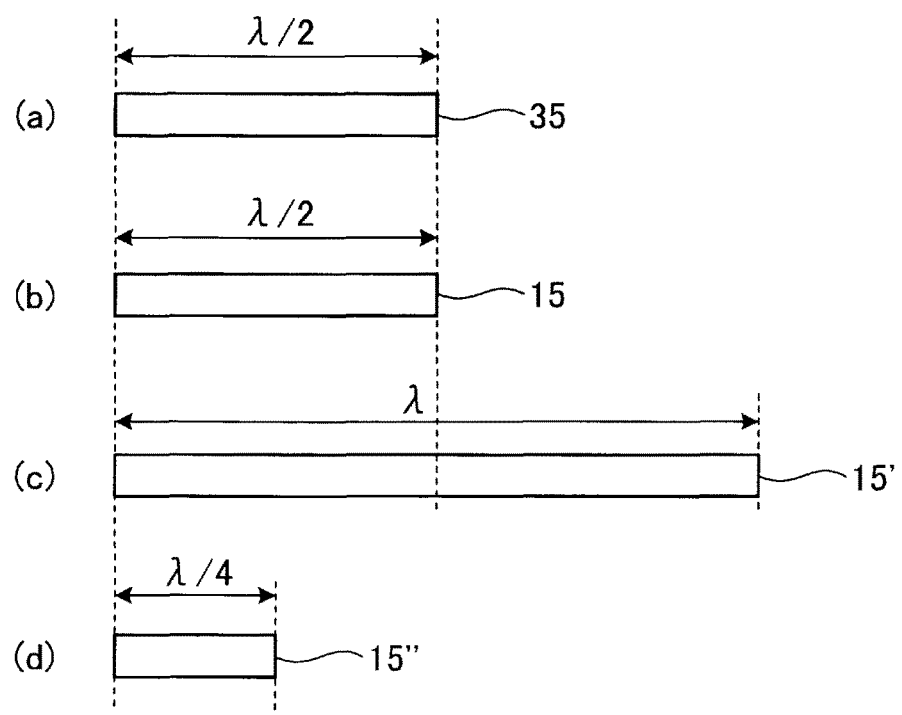
FIG. 8 is a diagram illustrating the relationship between the electrical length of a slot of a slot antenna and the electrical length of a slot that is disposed opposing the slot of the slot antenna.

Further, as illustrated in FIG. 8, the electrical length of the slot 15 may be the same as or different from the electrical length of the slot 35 of the slot antenna A1. In FIG. 8B, the slot 35 of the slot antenna A1 and the slot 15 have the same electrical length, $\lambda/2$. In FIG. 8C, the electrical length ($\lambda$) of the slot 15' is double the electrical length ($\lambda/2$) of the slot 35 of the slot antenna A1. In FIG. 8D, the electrical length ($\lambda/4$) of a slot 15" is half the electrical length ($\lambda/2$) of the slot 35 of the slot antenna A1. Basically, the electrical length of a slot for resonance may take any integral multiple of $\frac{1}{4}$ of the operating wavelength $\lambda$ of the slot antenna A1.

In the foregoing, the description has been given of the examples in which the keyboard cover 11 is formed of a dielectric. The following will describe an example in which the keyboard cover 11 is formed of a conductor. In the case where the keyboard cover 11 is formed of a conductor, a slot is preferably provided at a location in the keyboard cover 11 that opposes the slot 15 of the base cover 12. The area of the opening of the slot in the keyboard cover 11 is preferably larger than the slot 15, and also preferably filled with a dielectric rather than leaving the inside hollow, as with the slot 15. Alternatively, the area of the opening and its peripheral area of the slot of the keyboard cover 11 may be formed of a dielectric.

As has been described, the present invention provides an electronic device having a slot antenna capable of suppressing a reduction in the antenna gain of a slot antenna when the electronic device is operated in various operation modes.

While the invention has been particularly shown and described with reference to a preferred embodiment, it will be understood by those skilled in the art that various changes in form and detail may be made therein without departing from the spirit and scope of the invention.

What is claimed is:

1. An electronic device comprising:
   a main unit chassis having a first surface and a second surface, wherein said first surface of said main unit chassis is covered by a base cover formed of a conductor, wherein said second surface of said main unit chassis is covered by a keyboard and a keyboard cover formed of a dielectric, wherein said base cover includes a slot;
   a hinge;
   a slot antenna; and
   a display chassis having a first surface and a second surface, wherein said display chassis is connected to said main unit chassis via said hinge, wherein said first surface of said display chassis is covered by a display cover formed of a conductor, wherein said second surface of said display chassis is covered by a display unit and a bezel formed of a dielectric, wherein said display cover includes a slot at which said slot antenna is located, wherein said slot of said base cover is located at a position that opposes said slot of said display cover when said display cover of said display chassis overlaps with said base cover of said main unit chassis.

2. The electronic device of claim 1, wherein said display chassis includes a feeder antenna to excite said slot antenna.

3. The electronic device of claim 2, wherein said feeder antenna is a monopole antenna.

4. The electronic device of claim 2, wherein said feeder antenna is a dipole antenna.

5. The electronic device of claim 1, wherein
   said base cover includes a second slot located adjacent to the same edge of said base cover as said slot in said base cover; and
   said display cover includes a second slot located adjacent to the same edge of said display cover as said slot in said display cover.

6. The electronic device of claim 1, wherein said slot in said display cover and said slot in said base cover have identical opening shapes.

7. The electronic device of claim 1, wherein an electrical length of said slot in said base rover is an integral multiple of ¼ of an operating wavelength of said slot antenna.

8. An electronic device comprising:
   a main unit chassis includes a first conductive cover having a first slot;
   a slot antenna; and
   a display chassis connected to said main unit chassis via a hinge, wherein said display chassis includes a second conductive cover having a second slot provided at a position opposes said first slot when said main unit chassis and said display overlap each other, wherein said slot antenna is located at said second slot.

9. The electronic device of claim 8, wherein
   said first slot is located adjacent to an edge of said main unit chassis opposite to an edge at which said hinge is located; and
   said second slot is located adjacent to an edge of said display chassis opposite to an edge at which said hinge is located.

10. The electronic device of claim 8, wherein
    said first conductive cover is coupled to a keyboard; and
    said second conductive cover is coupled to a display.

11. The electronic device of claim 8, wherein said first slot is filled with a dielectric.

12. The electronic device of claim 8, wherein the opening shape of said first slot is identical to the opening shape of said second slot.

13. The electronic device of claim 8, wherein said second slot is filled with a dielectric.

14. The electronic device of claim 8, wherein said display chassis includes a feeder antenna to excite said slot antenna.

15. The electronic device of claim 14, wherein said feeder antenna is a monopole antenna.

16. The electronic device of claim 14, wherein said feeder antenna is a dipole antenna.

17. The electronic device of claim 8, wherein an electrical length of said first slot is an integral multiple of ¼ of an operating wavelength of said slot antenna.

18. The electronic device of claim 1, wherein
    said slot in said base cover is located adjacent to an edge of said main unit chassis opposite to an edge at which said hinge is located; and
    said slot in said display cover is located adjacent to an edge of said display chassis opposite to an edge at which said hinge is located.

19. The electronic device of claim 1, wherein said slot in said base cover is filled with a dielectric.

20. The electronic device of claim 1, Wherein said slot in said display cover is filled with a dielectric.

* * * * *